April 26, 1955
C. B. MOORE
2,706,994
PNEUMATIC CONTROL APPARATUS WITH MANUAL TRANSFER UNIT
Filed Sept. 9, 1949
3 Sheets-Sheet 1
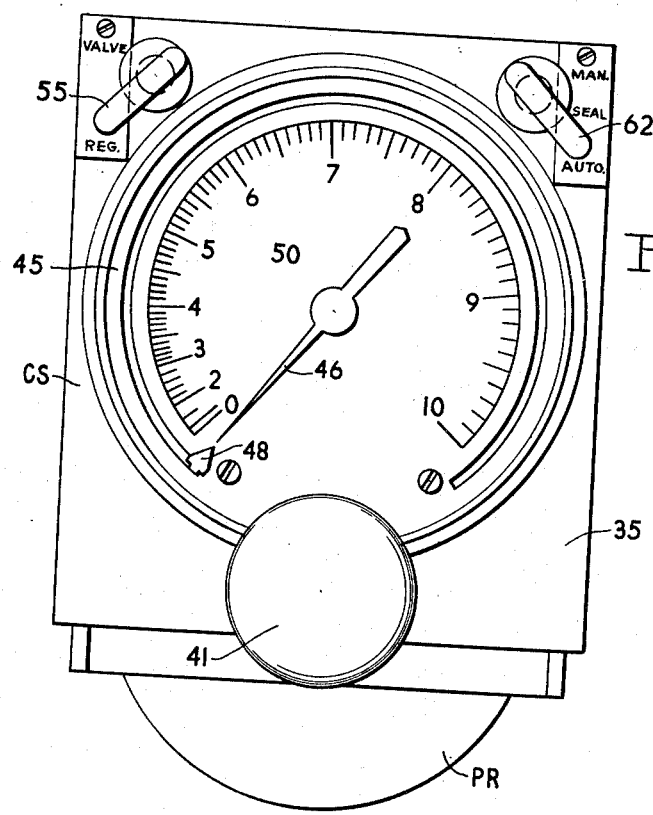
Fig_1
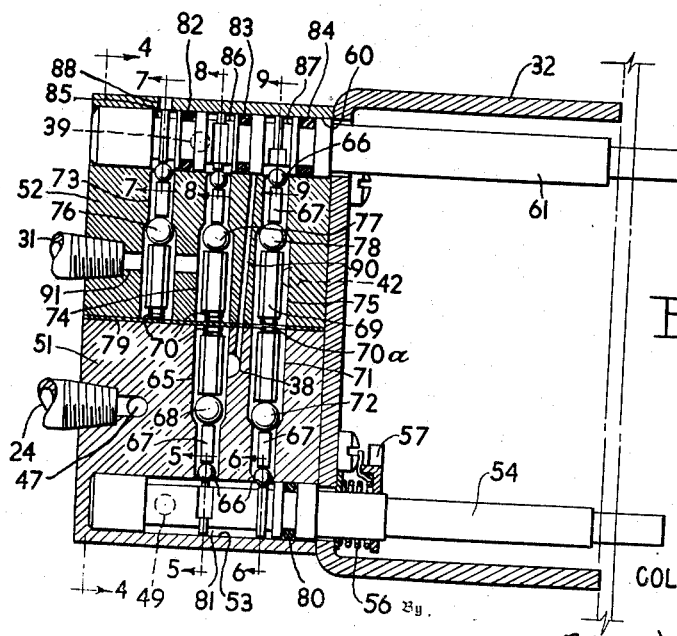
Fig_3
Inventor
COLEMAN B. MOORE
Attorney April 26, 1955
C. B. MOORE
2,706,994
PNEUMATIC CONTROL APPARATUS WITH MANUAL TRANSFER UNIT
Filed Sept. 9, 1949
3 Sheets-Sheet 2
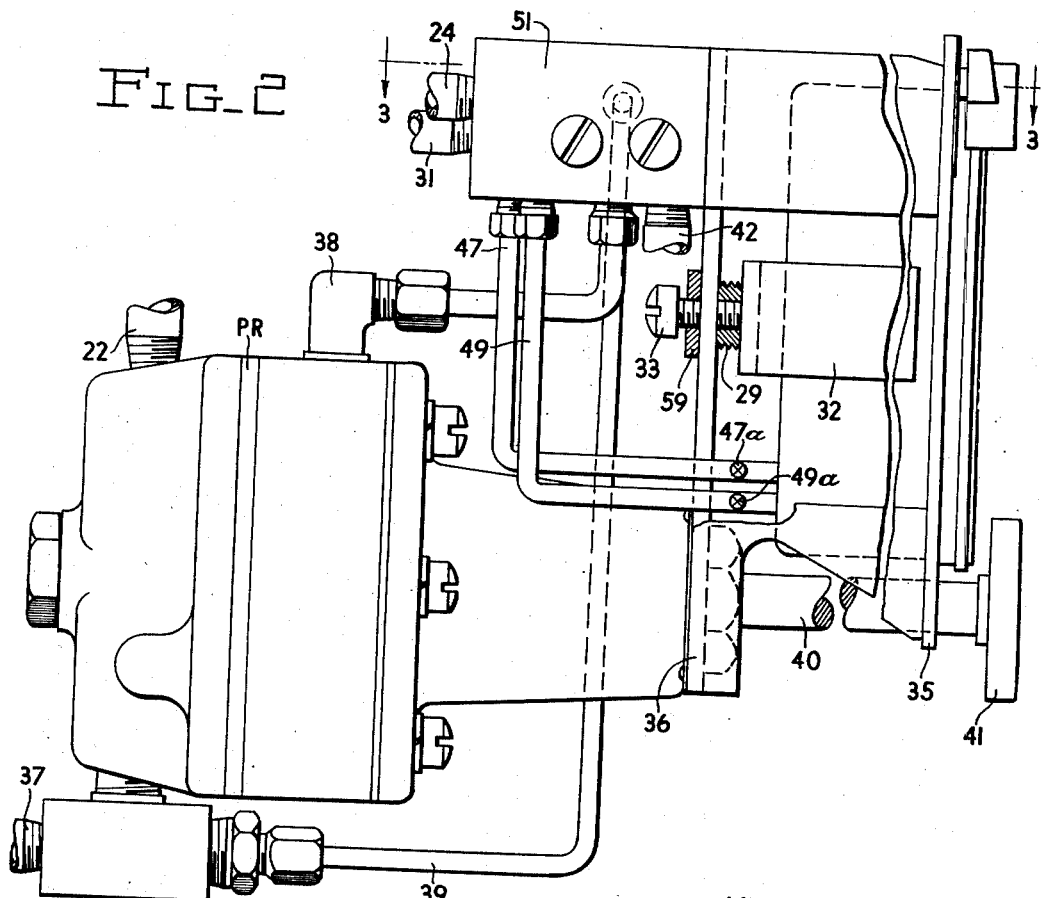
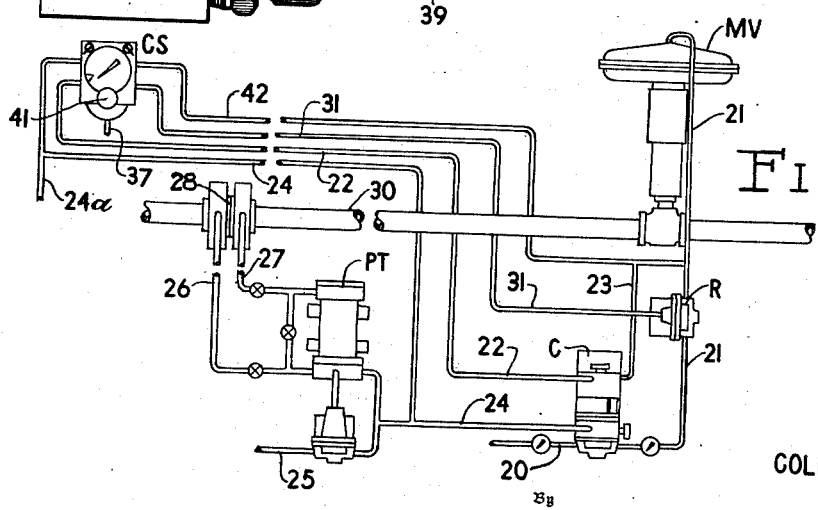
Inventor
COLEMAN B. MOORE
Attorney April 26, 1955
C. B. MOORE
2,706,994
PNEUMATIC CONTROL APPARATUS WITH MANUAL TRANSFER UNIT
Filed Sept. 9, 1949
3 Sheets-Sheet 3
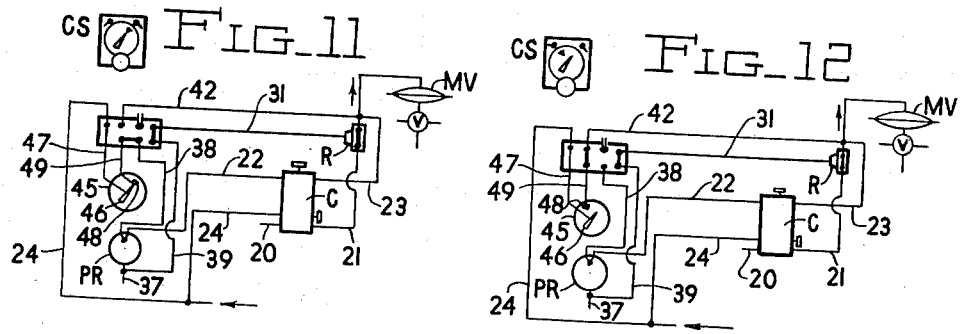
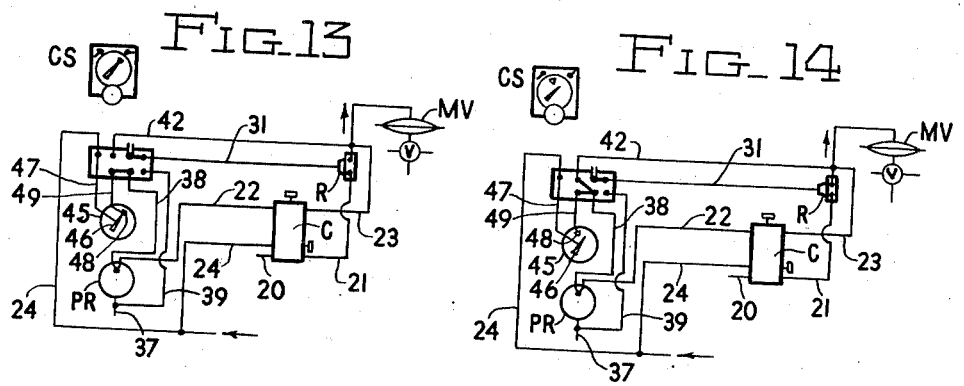
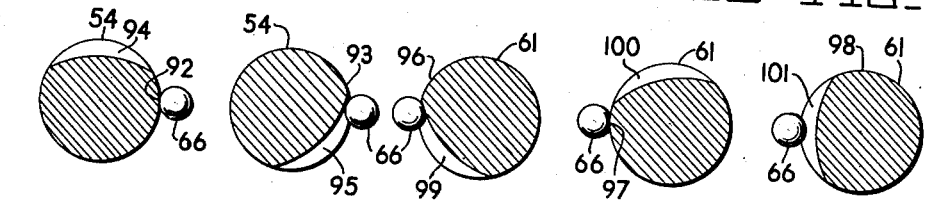
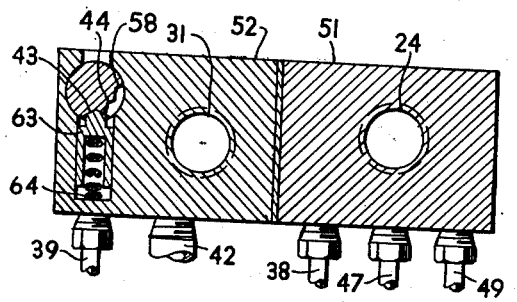
Inventor
COLEMAN B. MOORE
Attorney United States Patent Office 2,706,994
Patented Apr. 26, 1955

2,706,994

PNEUMATIC CONTROL APPARATUS WITH MANUAL TRANSFER UNIT

Coleman B. Moore, Carroll Park, Pa., assignor, by mesne assignments, to Moore Products Co., Philadelphia, Pa., a corporation of Pennsylvania Application September 9, 1949, Serial No. 114,811

4 Claims. (Cl. 137—85)

This invention relates to pneumatic control apparatus and more particularly relates to a control station for use on panels, consoles, and panel boards.

It is the principal object of the present invention to provide a control station for pneumatic process control apparatus having a pressure regulated supply with which transfers of the process from automatic to manual operation, and from manual to automatic operation may be readily effected.

It is a further object of the present invention to provide a control station for pneumatic process control apparatus with which transfers of the process from manual to automatic operation and from automatic to manual operation may be readily effected and in which indications of the process, control point and valve pressures are available.

It is a further object of the present invention to provide a control station for pneumatic process control apparatus with which a transfer between manual and automatic operation may be effected in either direction and in which the control valve pressure is sealed while a transfer is being made.

It is a further object of the present invention to provide a control station for pneumatic process control apparatus with which a transfer between manual and automatic operations may be effected in either direction, smoothly and without "bumping" the process.

It is a further object of the present invention to provide a control station for pneumatic process control apparatus which permits of the use of a single visual indicator for selectively indicating either of two pressures, and which also permits of a transfer from manual to automatic operation, in either direction.

It is a further object of the present invention to provide a control station for pneumatic process control apparatus at which there is available multiple indication of the process transmitter output and the set value of the process, in an improved manner.

It is a further object of the present invention to provide a control station or panel unit for pneumatic process control apparatus which may be readily installed, which has a variety of uses, and in which the parts thereof are readily accessible for servicing.

It is a further object of the present invention to provide a control station for use with pneumatic process control apparatus of the type including a process transmitter, an air controller and an air motor operated control valve.

It is a further object of the present invention to provide a control station or panel unit for pneumatic process control apparatus which may be mounted remote from the process transmitter, the air controller and the control valve.

It is a further object of the present invention to provide a control station made as a compact unit with visual indication for use on panel arrangements having a graphic representation of the process on the panel.

Other objects and advantageous features of the invention will be apparent from the specification and claims.

The nature and characteristic features of the invention will be more readily understood from the following description, taken in connection with the accompanying drawings forming part hereof, in which:

Figure 1 is a front elevational view of a control station or panel unit in accordance with the present invention;

Fig. 2 is a side elevational view of the unit shown in Fig. 1, parts being broken away to show the details of construction;

Fig. 3 is a horizontal sectional view taken approximately on the line 3—3 of Fig. 2;

Fig. 4 is a vertical sectional view taken approximately on the line 4—4 of Fig. 3;

Figs. 5 and 6 are transverse sectional views, enlarged, taken approximately on the lines 5—5 and 6—6, respectively, of Fig. 3 and showing the cam portions of one of the shafts in one of its operating positions;

Figs. 7, 8 and 9 are transverse sectional views, enlarged, taken approximately on the lines 7—7, 8—8, 9—9, respectively, of Fig. 3 and showing the cam portions of another of the shafts in one of its operating positions;

Fig. 10 is a diagrammatic view of the pneumatic process control system employing a panel unit in accordance with the present invention; and Figs. 11, 12, 13, and 14 are diagrammatic views of circuits illustrating the transfer of a process from automatic to manual operation, and the visual indication thereof.

It should, of course, be understood that the description and drawings herein are illustrative merely, and that various modifications and changes may be made in the structure disclosed without departing from the spirit of the invention.

Like numerals refer to like parts throughout the several views.

For purposes of illustration and explanation the control station or panel unit is shown in its relation to other components of a pneumatic process control system with which the same may be employed although it can be applied to other pneumatic control systems.

Referring first to Fig. 10, an air controller C is shown which may be of any desired type but is preferably such as is shown in the prior application for patent of C. B. Moore, filed September 29, 1943, Serial No. 504,258, now Patent No. 2,520,468, and which has a fluid connection 20 to a suitable source of fluid under pressure, such as air, a fluid connection 21 for delivery of a controller output or valve pressure, a fluid connection 22 for the input of a control point setting pressure, a fluid connection 23 for feed back, and a fluid connection 24 for input of the process or transmitted pressure. The fluid connection 24, may if desired, have a branch 24a for connection to a recorder (not shown).

The process or transmitted pressure may be derived from any suitable source and for this purpose a differential pressure transmitter PT, such as is shown in Patent No. 2,312,201 to C. H. Thompson and C. B. Moore, may be employed. Such a differential pressure transmitter PT has a fluid supply connection 25 connected to a suitable source of fluid, such as air, under pressure, and is effective, by a differential of the pressure applied through conduits 26 and 27 connected on opposite sides of a metering orifice 29 in a conduit 30, for transmitting a pressure to the fluid connection 24.

The valve pressure which is the transmitted pressure from the controller C is effective, through the connection 21, on a motor operated valve MV in the conduit 30 for controlling the flow through the conduit 30.

A cut-off relay R is preferably interposed in the fluid connection 21 and comprises a pressure responsive valve normally held in open position by pressure fluid applied thereto from a fluid connection 31, and closed when fluid pressure is vented therefrom, as hereinafter explained. The control station or panel unit CS may be utilized with the structure heretofore described and, in accordance with the present invention, includes a front panel plate 35 to the rear of which and disposed in parallel relation thereto a supporting plate 36 is provided. The supporting plate 36, at the lower portion thereof, has a pressure fluid regulator PR of any preferred type mounted thereon. A suitable pressure regulator is that shown in the prior application of C. B. Moore, filed July 12, 1944, Serial No. 544,560, now abandoned.

The pressure regulator PR has a supply connection 37 which is connected to a suitable source of fluid under pressure such as air. The regulator PR also has the connection 22 and a fluid delivery connection 38 for supplying fluid at the control point setting pressure, as hereinafter explained. The pressure regulator PR has a fluid connection 39 in direct communication with the supply connection 37. The pressure regulator PR is provided with a manual adjusting screw 40 extending through the front plate 35 and provided at the outer terminal end thereof with an adjusting knob 41. A fluid connection 42 is provided connected to the connection 21 between the relay R and the valve MV.

At the central portion of the front panel plate 35 a multiple pointer dial indicating gage 45 is provided, having an inner indicating pointer 46 movable in response to pressure applied through a fluid pressure connection 47, and having an outer indicating pointer 48 independently movable with respect to the pointer 46 and in response to pressure applied through a fluid pressure connection 49. A restriction 47a may be provided in the connection 47 and a restriction 49a may be provided in the connection 49.

An indicating dial 50 is also provided, as part of the gage 45, and may be calibrated and marked in any desired manner. The gage 45 is provided with a threaded stud 29 for engagement in the plate 36 and a nut 59 is provided for locking the stud in position.

In order to mount the instrument, a mounting bracket 32 is provided of U shape, having a central opening surrounding the stud 29, and screws 33 in threaded engagement on each side in the mounting plate 36 are adapted to engage with and position the bracket 32, to clamp the instrument on a panel (not shown) between the forward ends of the bracket 32 and the front plate 35.

The upper part of the mounting plate 36 has secured thereto a pair of valve blocks 51 and 52 disposed in abutting relation. The block 51 is provided with a bore 53 in which a shaft 54 is mounted. The shaft 54 has a forward extension which extends outwardly beyond the front panel plate 35 and is provided with an operating handle 55. The front panel plate 35 is provided with identifying indicia for indicating the positioning of the handle 55 at either of two locations respectively identified as "Valve" and "Reg." or regulator. The shaft 54 preferably has a return spring 56 connected thereto for normally positioning the shaft 54 and the handle 55 at the "Reg." position but permits of turning the shaft against the force of the spring 56 to the "Valve" position. Suitable stops are provided for limiting the movement of the shaft 54, one of which is shown at 57.

The block 52 is provided with a bore 60 in which a shaft 61 is mounted. The shaft 61 has a forward extension which extends outwardly beyond the front panel plate 35 and is provided with an operating handle 62. The front panel plate 35 is provided with identifying indicia for indicating the positioning of the handle 62 at any one of three positions, respectively identified as "Man." or manual, "Seal," and "Auto." or automatic. The shaft 61 is provided at the rear end thereof with a detent preferably comprising a detent pin 63 normally urged into engaging position by a spring 64. The shaft 61 is provided with depressions 58, 44 and 43, for engagement by the free end of the pin 63 and the depressions correspond respectively, to the manual, seal, and automatic positions previously referred to.

The valve block 51 is provided with a bore 65, intersecting the bore 53. The bore 65 is shaped at its intersection to retain and prevent excessive outward movement of a control ball 66 with which an actuating rod 67 in the bore 65 is in engagement. The rod 67 is preferably square in cross section so as to be guided by the bore 65 and permit the passage of fluid in the space between the bore and the rod. The inner end of the bore 65 is enlarged and has a valve ball 68 seating at the terminus of the enlargement and with which rod 67 is in actuating engagement. In engagement with the valve ball 68 and oppositely disposed with respect to the rod 67, a seating rod 69 is provided, preferably hexagonal in cross section, and a spring 70 at the inner end of the rod 69 urges the valve ball 68 to seated position.

The valve block is also provided with a bore 71 similar to the bore 65 within which a control ball 66, an actuating rod 67, a seating rod 69 and a spring 70a are provided, similar to those previously described, for controlling a valve ball 72.

The valve block 52 is also provided with a plurality of bores 73, 74 and 75, intersecting the bore 60, and within which valve balls 76, 77 and 78 are disposed, together with control balls 66, actuating rods 67, seating rods 69 and springs 70 or 70a are mounted, similar to those previously described.

Between the valve blocks 51 and 52 a sealing plate or diaphragm 79 may be provided for sealing the inner end of the bore 73 and for sealing the inner ends of the bores 65 and 74 from communication. The bores 71 and 75 are, however, in communication so that one spring 70a may be employed in engagement with the seating rods of the valve balls 72 and 78.

Within the bore 53, which is closed at its rear end, a sealing ring 80 is provided, in engagement with the bore 53 and with the shaft 54, forwardly beyond the bore 71. The shaft 54 has a portion of reduced diameter to provide a chamber 81 which is in continuous communication with the outer ends of the bores 65 and 71 beyond the valve balls 68 and 72. The chamber 81 is connected by the fluid connection 49 to the gage 45 for supplying pressure from the chamber 81 for actuating the pointer 48.

The space in the bores 71 and 75 between the valve balls 72 and 78 is in communication with the fluid connection 42.

Within the bore 60, spaced sealing rings 82, 83 and 84 are provided in engagement with the bore 60 and the shaft 61, and the shaft 61 has portions of reduced cross section to provide a chamber 85 beyond the ring 82 with which the outer end of the bore 73 is in communication, a chamber 86 between the rings 82 and 83 with which the outer end of the bore 74 is in communication, and a chamber 87 between the rings 83 and 84 with which the outer end of the bore 75 is in communication. The chamber 85 is vented to the atmosphere through a vent port 88. The chamber 86 has the connection 39 in communication therewith. The chamber 87 is connected by a fluid passageway 90 to the bore 65 interiorly of the valve ball 68 and is connected to the connection 38.

A passageway 91 is also provided, in communication with the fluid connection 31, which extends to the bore 73 and to the bore 74 interiorly of the valve balls 76 and 77.

The valve block 51 has the fluid connection 24 extending thereto with which the fluid connection 47 is in communication.

In order to permit the valve balls 68 and 72 to seat and to be moved from their seats in the desired sequence the shaft 54 is provided with peripheral cam surfaces 92 and 93 as shown in Figs. 5 and 6. Undercut portions 94 and 95 are provided which permit outward movement of the control balls 66 and seating of the valve balls 68 and 72. The remaining peripheral portions 92 and 93 are adapted by engagement with the balls 66 through the rods 67 to move the valve balls 68 and 72 from their seats and permit fluid flow therebeyond.

The cam portions 94 and 95 are shown in Figs. 5 and 6 in relation to the balls 66 for the positions occupied when the shaft 54 is in "Reg." position, with valve ball 68 held off its seat and permitting fluid flow through the bore 65, and with valve ball 72 on its seat and cutting off fluid flow through the bore 71.

It will be noted that upon clockwise movement of the shaft 54, through an angle of the order of 45°, to the "Valve" position, the valve balls 68 and 72 will be reversed, the valve ball 68 being permitted to seat and cut off fluid flow through the bore 65 and the valve ball 72 being moved off its seat and permitting fluid flow through the bore 71.

In order to permit the valve balls 76, 77 and 78 to seat and to be moved from their seats in the desired sequence the shaft 61 is provided with peripheral cam surfaces 96, 97 and 98 as shown in Figs. 7, 8, and 9. Undercut portions 99, 100 and 101 are provided which permit outward movement of the balls 66 and seating of the valve balls 76, 77 and 78. The remaining peripheral portions 96, 97 and 98 are adapted, be engagement with the balls 66 through the rods 67 to move the valve balls 76, 77 and 78 from their seats and permit fluid flow therebeyond.

The cam portions 99, 100 and 101 are shown in Figs. 7, 8, and 9, in relation to the balls 66 for the positions occupied when the shaft 61 is in the position for "Automatic" control, with the valve ball 76 on its seat, the valve ball 77 held off its seat, and the valve ball 78 on its seat.

It will be noted that upon counterclockwise movement of the shaft 61 through an angle of 45° to the "Seal" position, the valve ball 76 will be moved and held off its seat, the valve ball 77 will be permitted to seat, and the valve ball 78 will continue seated.

Upon further counterclockwise movement of the shaft 61, through a further angle of 45°, to the "Manual" position, the valve ball 76 will be held off its seat, the valve ball 77 will remain seated and the valve ball 78 will be moved and held off its seat.

The mode of operation will now be pointed out.

With the handle 62 in automatic position, assuming that the pressure transmitter PT is supplying a measured variable or transmitted pressure to the controller C through the connection 24, this same pressure is available through the fluid connections 24 and 47 and the restriction 47a for positioning the pointer 46. Pressure from the supply connection 37 is available through the fluid connection 39, chamber 86, bore 74, past valve ball 77 in open position, passageway 91 and fluid connection 31 to the cut off relay R to position the same for flow through the fluid connection 21 for delivery of the output pressure of the controller C to the motor valve MV. The output pressure of the regulator PR is available through the fluid connection 22 as a control setting pressure and through the fluid connection 38, is available in the bore 65, past the valve ball 68 in open position, to the chamber 81 and therefrom through the fluid connection 49 and restriction 49a for actuating the pointer 48.

When it is desired to shift from automatic to manual control the valve pressure in the line 21 to the valve MV may be ascertained by shifting the actuating handle 55 and the shaft 54 clockwise from the regulator to the valve position.

This movement of the shaft 54 permits movement of valve ball 68 to closed position, thus shutting off fluid delivery through the connection 38 from the regulator PR. At the same time, the valve ball 72 is moved to open position so that valve pressure from the fluid connection 42 is available through bores 75 and 71, past the valve ball 72 in open position to chamber 81 and therefrom through fluid connection 49 and restriction 49a for actuating the pointer 48. The pressure thus indicated is noted and the shaft 54 is permitted to return to its initial position by the action of the return spring 56.

The operating handle 62 is now moved to the "Seal" position. This positions the shaft 61 as pointed out above to move valve ball 76 off its seat, with valve balls 77 and 78 is seated position. The pressure supplied from passageway 39 is cut off by the seating of the valve ball 77, and the fluid connection 31 is vented to the atmosphere through the passageway 91, bore 73, past valve ball 76 in open position, to chamber 85 and therefrom through vent port 88, thus releasing the cut-off relay R. The valve pressure is thus sealed between the relay R and the valve MV in the fluid connection 21.

The output of the regulator PR may then be adjusted, by movement of the handle 41, to bring the pressure of the output to the previously observed valve pressure.

The operating handle 62 may then be moved to the "Manual" position to complete the transfer by opening the valve ball 78 thus applying the pressure from the regulator PR to the motor valve MV and with the pressure from the regulator PR as just referred to there will not be any bump in the process. With the handle 62 in the "manual" position, the valve balls 76 and 78 will be off their seats and the valve ball 77 will be seated. Pressure fluid from the regulator PR will be available through the connection 38, passageway 90, chamber 87, past valve ball 78 in open position, bore 75 and passageway 42 to the valve MV. Pressure fluid will also be available from the connection 38 through bore 65, past valve ball 68 in open position to chamber 81 and through connection 49 and restriction 49a for operating the pointer 48.

The output of the pressure regulator PR, as indicated by pointer 48, may then be varied by the operator by manipulation of the knob 41 to manually position the motor valve MV.

With the handle 62 in manual position, if it is desired to change to automatic operation, this may be effected in the manner to be pointed out.

The handle 62 is moved to the seal position which seals the valve MV by the seating of the valve ball 78. The knob 41 may then be adjusted to position the pointer 48 to the desired control point which is preferably coincident with the indicated value of the process as shown by the pointer 46.

The handle 62 may then be moved to the automatic position thereby opening the relay R so that the output of the controller C is again effective on the valve MV.

The feed back connection 23 is provided for applying to the reset structure of the controller C the pressure effective on valve MV for manual as well as for automatic control. In this manner the reset pressure is matched to the pressure at the valve MV at the instant of shifting from manual to automatic control, thereby effecting a smooth transition without any "bump."

The restrictions 47a and 49a interposed in the fluid connections 47 and 49 to the gage 45 prevent sudden pressure changes from occurring within the gage mechanism which might otherwise result when the handle 55 is moved or when some external connections are changed or broken.

I claim:

1. In pneumatic control apparatus, a controller having a fluid pressure actuated member for setting the control point and having a fluid connection for the delivery of a controlled pressure, a pressure fluid regulator connected to a source of pressure fluid, a fluid connection from said regulator to said pressure actuated member for supplying a control point setting pressure to said controller, and manually actuated members interposed between said regulator and said first mentioned fluid connection for supplying a substituted pressure from said regulator to said first mentioned fluid connection.

2. In pneumatic control apparatus, a fluid pressure responsive controller, a pressure fluid regulator, a pressure indicator, a first fluid connection for delivering a controlled pressure from said controller, a second fluid connection between said regulator and said first fluid connection, a third fluid connection between said regulator and said controller, two separately actuable manually operable valves for controlling certain of said fluid connections, one of said valves having portions for connecting said indicator to said first fluid connection in one position and the indicator to the regulator in another position, the other of said valves having portions for connecting the first fluid connection to the controller in one position, sealing fluid within the first fluid connection in another position and connecting the first fluid connection to the regulator in still another position.

3. In pneumatic control apparatus, a fluid pressure responsive controller, a pressure fluid regulator, a pressure indicator, a first fluid connection for delivering a controlled pressure from said controller, a second fluid connection between said regulator and said first fluid connection, a third fluid connection between said regulator and said controller, a cut-off relay interposed in said first fluid connection, two separately actuable manually operable valves for controlling certain of said fluid connections, one of said valves having portions for connecting said indicator to said first fluid connection in one position and the indicator to the regulator in another position, the other of said valves having portions for controlling the cut-off relay to connect the first fluid connection to the controller in one position, controlling the cut-off relay to seal fluid within the first fluid connection in another position, and connecting the first fluid connection to the regulator in still another position.

4. In pneumatic control apparatus, a fluid pressure responsive controller, a pressure fluid regulator, a pressure indicator, a first fluid connection for delivering a controlled pressure from said controller, a second fluid connection between said regulator and said first fluid connection, a third fluid connection between said regulator and said controller, a cut-off relay interposed in said first fluid connection, two separately actuable manually operable valves for controlling certain of said fluid connections, one of said valves having portions for connecting said indicator to said first fluid connection in one position and the indicator to the regulator in another position, the other of said valves having portions for effecting opening of the cut-off relay in one position, effecting closing of the cut-off relay in another position, and effecting closing of the cut-off relay and connecting the first fluid connection to the regulator in still another position.

References Cited in the file of this patent

UNITED STATES PATENTS

| | | |
|---|---|---|
| 2,202,286 | Gorrie | May 28, 1940 |
| 2,232,219 | Dueringer | Feb. 18, 1941 |
| 2,314,152 | Mallory | Mar. 16, 1943 |
| 2,366,883 | Tydon | Jan. 9, 1945 |
| 2,369,887 | Eckman | Feb. 20, 1945 |
| 2,436,451 | Rosenberger | Feb. 24, 1948 |
| 2,452,295 | Elliott | Oct. 26, 1948 |
| 2,461,026 | Bilyeu | Feb. 8, 1949 |
| 2,517,051 | Swenson | Aug. 1, 1950 |
| 2,612,902 | Ward | Oct. 7, 1952 |
| 2,638,117 | Horn | May 12, 1953 |